(12) United States Patent  (10) Patent No.: US 7,576,516 B2
Greenslade                  (45) Date of Patent: *Aug. 18, 2009

(54) BATTERY ADAPTER SYSTEM

(75) Inventor: Kenneth Greenslade, Mims, FL (US)

(73) Assignee: Knight's Armament Co., Titusville, FL (US)

( * ) Notice: Subject to any disclaimer, the term of this patent is extended or adjusted under 35 U.S.C. 154(b) by 16 days.

This patent is subject to a terminal disclaimer.

(21) Appl. No.: 12/072,307

(22) Filed: Feb. 26, 2008

(65) Prior Publication Data
US 2008/0246435 A1    Oct. 9, 2008

Related U.S. Application Data

(63) Continuation of application No. 11/732,152, filed on Apr. 3, 2007.

(51) Int. Cl.
H02J 7/00      (2006.01)
H05K 5/00      (2006.01)
H05K 7/00      (2006.01)
G02B 23/12     (2006.01)
F41G 1/00      (2006.01)

(52) U.S. Cl. ............ 320/110; 361/679.01; 320/107; 359/353; 42/111; 42/132

(58) Field of Classification Search ........ 361/679.01, 361/110
See application file for complete search history.

(56) References Cited

U.S. PATENT DOCUMENTS 4,397,920 A * 8/1983 Trattner ................ 429/100
6,418,657 B1 * 7/2002 Brown .................. 42/124
7,417,403 B2 * 8/2008 Hankel et al. ............ 320/110
7,482,712 B2 * 1/2009 Ford et al. .............. 307/127

* cited by examiner

Primary Examiner—Stephen W Jackson
Assistant Examiner—Dharti Patel
(74) Attorney, Agent, or Firm—Opticus IP Law PLLC

(57) ABSTRACT

The battery adapter system includes a housing having a body portion and a reversible cap adapted to screw on and off of the body portion. The body portion has an interior sized to accommodate the whole of a relatively short and wide 3-volt lithium battery or to partially accommodate the narrower, taller 1.5-volt AA battery. The reversible cap has an open end and an interior, and has outer threads that allow the cap to screw to the body portion in either of two orientations. When using the smaller and wider lithium battery, the cap is screwed onto the body portion in a first orientation that forms a first sealed housing interior that does not include the cap interior. When using the taller and thinner AA battery, the cap is screwed onto the body portion in a second orientation wherein the cap open end is first placed over the portion of the AA battery that protrudes from the body portion. This forms a second sealed housing interior that includes the cap interior. The housing is designed to provide an electrical connection between the battery housed therein and a voltage regulating circuit, which is adapted to provide a 3 volt DC output for an input voltage anywhere between 0.6 volt and 3 volts. The output voltage is suitable for powering an electrical and/or optical device such as a light-emitting device.

23 Claims, 10 Drawing Sheets

BATTERY ADAPTER SYSTEM

RELATED APPLICATIONS AND CLAIM OF PRIORITY

The present application is a continuation of and claims priority from U.S. patent application Ser. No. 11/732,152, entitled "Battery adapter system and night-vision scope using same," filed on Apr. 3, 2007, which application is incorporated by reference herein.

FIELD OF THE INVENTION

The present invention relates generally to battery adapters, and in particular, a battery adapter system for electrically powering an optical and/or electronic device.

BACKGROUND ART

Battery adapters are used for a variety of optical and/or electrical devices that can be or that need to be powered by different types and sizes of batteries. One such device is a night-vision scope. Night-vision scopes are used to intensify low-level visible and/or infrared light from a dimly lit scene so that the scene is visible to the human eye. The typical night-vision scope has an image-intensifier system that consists of an optics portion and a control (electronics) portion. The optics portion comprises an objective lens in optical communication with an image intensifier device that includes a photocathode. The objective lens images light (photons) from the low-light scene onto the photocathode. In response, the photocathode emits photo-electrons in proportion to the amount of light imaged at each photocathode location, thereby forming an electron pattern representative of the low-level scene image. The emitted photo-electrons are then accelerated by a first large voltage potential (e.g., 5000 volts) through a micro channel plate, which acts to multiply the number of electrons via secondary cascaded emission. The multiplied electrons move toward a phosphor screen via a second voltage potential, which converts each incident electron into a corresponding photon. The result is a visible-light pattern representative of the dimly lit scene and that is visible to the human eye.

The control portion of the image intensifier system includes electronic circuitry and a power source necessary for controlling and powering the image intensifier portion of the night vision system. Since night-vision scopes are portable, the power source is a battery.

There are three basic approaches to providing the necessary electrical power via battery to operate the image intensifier of a night-vision scope. The first is to use two AA 1.5-volt batteries in series to provide 3 volts to the electronic circuitry. The second is to use a single 3-volt lithium battery (e.g., a DL123 battery). The third is to use one AA 1.5-volt battery in conjunction with a step-up circuit, such as described in U.S. Pat. No. 6,806,683 to Saldana (the '683 patent).

The '683 patent discloses a battery adapter system that uses a battery housing in combination with a step-up circuit mounted in the battery housing. The battery adapter system allows a night-vision device to use a single AA 1.5-volt battery. The motivation behind the '683 patent is that most missions where night-vision devices are used last less than 24 hours and so do not require two AA batteries. Because the single 1.5-volt battery provides the 3 volts needed, it is used up quicker than two batteries, so that the single battery is used nearly to or up to its life's end.

What is needed is a battery adapter system for use with electrical and/or optical devices that can accommodate different sized batteries having different voltages and that can also provide a constant output voltage for use by the electrical and/or optical system.

SUMMARY OF THE INVENTION

One aspect of the invention is a battery adapter system configurable to accommodate first or second batteries having different sizes and different voltages. The system includes a housing having a body portion adapted to accommodate through an open end either the entire first battery or a portion of the second battery and to establish electrical contact with whichever battery is used. In one example, the first battery is a relatively short and wide 3-volt lithium battery while the second battery is a narrower, taller 1.5-volt AA battery. The system includes a reversible cap with a closed end, an open end and an interior, the cap being adapted to be removably attached (e.g., via threads) to the body portion in two different orientations. In a first orientation, the cap serves to form a first sealed housing interior that does not include the cap interior and that operably houses the first, smaller battery. In a second (i.e., reverse) orientation, the cap serves to form a second sealed housing interior that includes the cap interior and that operably houses the larger second battery. The system also includes a voltage regulating circuit electrically connected to the battery and adapted to provide a substantially constant output voltage, such as 3 VDC even thought the first and second batteries have different voltages (e.g., 3V and 1.5V, respectively).

Another aspect of the invention is a battery adapter system for powering an electrical and/or optical device using one of first and second batteries having different sizes and voltages. The system includes a housing that includes a body portion configured to accommodate through an open end either the entire first battery or a portion of the second battery. The system includes a reversible cap having an open end and an interior. The cap is adapted to be threadedly attached to the body portion in first and second orientations. The first cap orientation forms a first sealed housing interior that does not include the cap interior and that operably houses the first battery. The second orientation forms a second sealed housing interior that includes the cap interior and that operably houses the second battery.

Another aspect of the invention is the battery adapter system of the present invention as described immediately above but that further includes a voltage regulating circuit electrically connected to the battery in the housing. The circuit is configured to provide a substantially constant output voltage from a range of battery voltages, such as 3V from a relatively short and wide lithium battery and 1.5V from a relative thin and tall AA battery.

Another aspect of the invention is the battery adapter system as describe above, further wherein voltage regulating circuit provides a 3 VDC output and wherein the battery voltages range from about 0.6 VDC to about 3 VDC.

Another aspect of the invention is the battery adapter system as describe above, further wherein the voltage regulating circuit is operably connected to an electrical and/or optical device. In one example, the electrical and/or optical device is or includes a light-emitting device or a light-intensification device.

Additional features and advantages of the invention will be set forth in the detailed description that follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

The present invention is directed to a battery adapter system. An example electrical and/or optical device to which the system can be operably connected is a night-vision scope such as the one described in U.S. Pat. No. 7,142,357 to Greenslade, which patent is incorporated by reference herein. The invention is described in connection with a night-vision scope as just one example of an electrical and/or optical device that can be used in conjunction with the battery adapter system of the present invention. In the night-vision scope embodiment discussed below, the electrical and/or optical device can be considered, for example, to be the image-intensifier assembly 50 or just the image-intensifier device 52 included as part of the assembly.

In the discussion below, "volts DC" is abbreviated "VDC."

Figure 1:
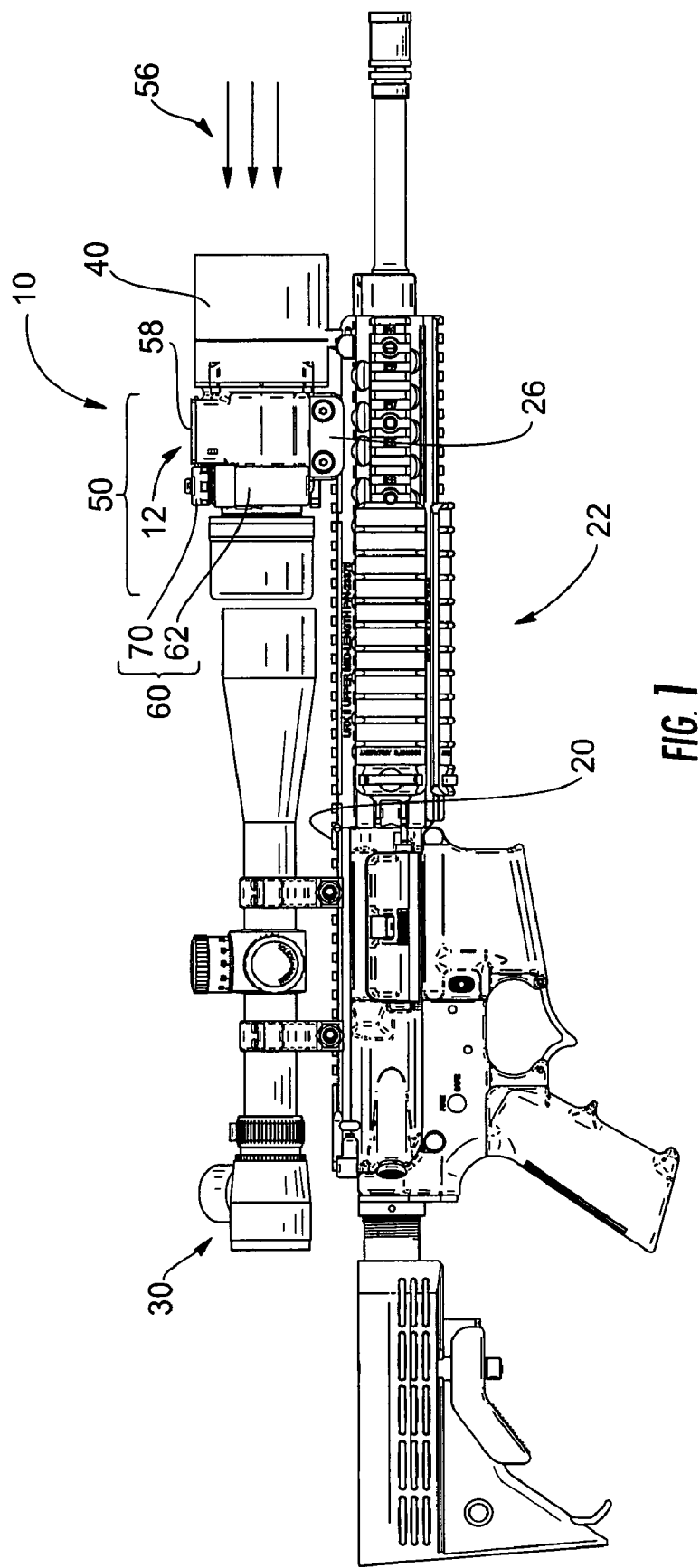
FIG. 1 is a side view of a rifle that includes a day scope and a night-vision scope according to the present invention.

FIG. 1 is a schematic side view of a night-vision scope 10 according to the present invention. Night-vision scope 10 includes a body 12. Night-vision scope 10 is shown in FIG. 1 as mounted on a quick-disconnect rail portion 20 of a rifle 22 using a quick-disconnect mount 26. Rifle 22 also includes a day scope 30 mounted to the rifle in-line and behind night-vision scope 10, as shown.

Figure 2:
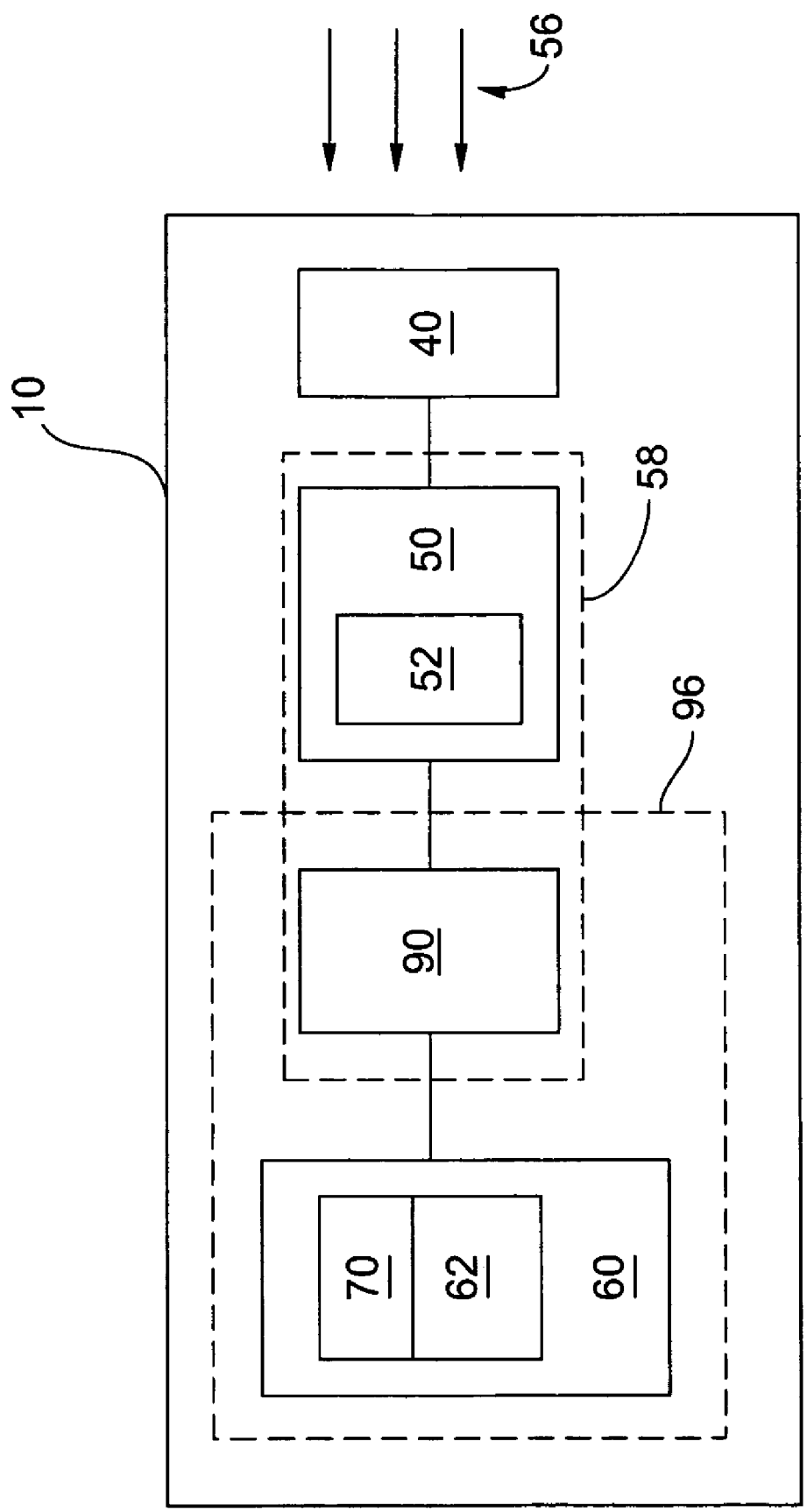
FIG. 2 is a schematic block diagram showing the basic components of the night-vision scope of the present invention.

FIG. 2 is a schematic block diagram showing the basic components of night-vision scope 10. With reference to FIGS. 1 and 2, night-vision scope 10 includes a lens assembly 40 in optical communication with an image-intensifier assembly 50 that includes an image-intensifier device 52. Image-intensifier assembly 50 is arranged to receive and intensify light 56 collected by the lens assembly and imaged thereby onto image-intensifier device 52 that is housed in a housing 58. Night-vision scope 10 includes a cylindrical battery housing 60 that includes a body portion 62 and a reversible cap 70. Battery housing 60 is electrically connected to a voltage-regulating circuit 90, which in turn is electrically connected to image-intensifier device 52. Battery housing 60 and voltage-regulating circuit 90 constitute a battery adapter system 96 for night-vision scope 10. In an example embodiment, voltage-regulating circuit 90 is located in housing 58 along with image-intensifier device 52.

As discussed in greater detail below, reversible cap 70 is adapted to threadedly connect with (i.e., screw into) the open end of the body portion in either of two orientations, with both orientations establishing electrical contact between the cap and body portion so as to complete the voltage regulating circuit (housing 60 is grounded to night-vision scope body 12). The two possible orientations of reversible cap 70 define two different but generally cylindrical sealed housing interiors designed to respectively operatively accommodate either a relatively tall, thin standard AA battery or a shorter, wider standard lithium battery (e.g., a DL123 battery) to power the image-intensifier assembly 50 (and in particular image intensifier device 52 therein) via voltage-regulating circuit 90. For the sake of description, the orientation of reversible cap 70 used to house an AA battery is called the "AA orientation," while the reverse orientation used to house a lithium battery is called the "L orientation."

Reversible Cap

Figure 3:
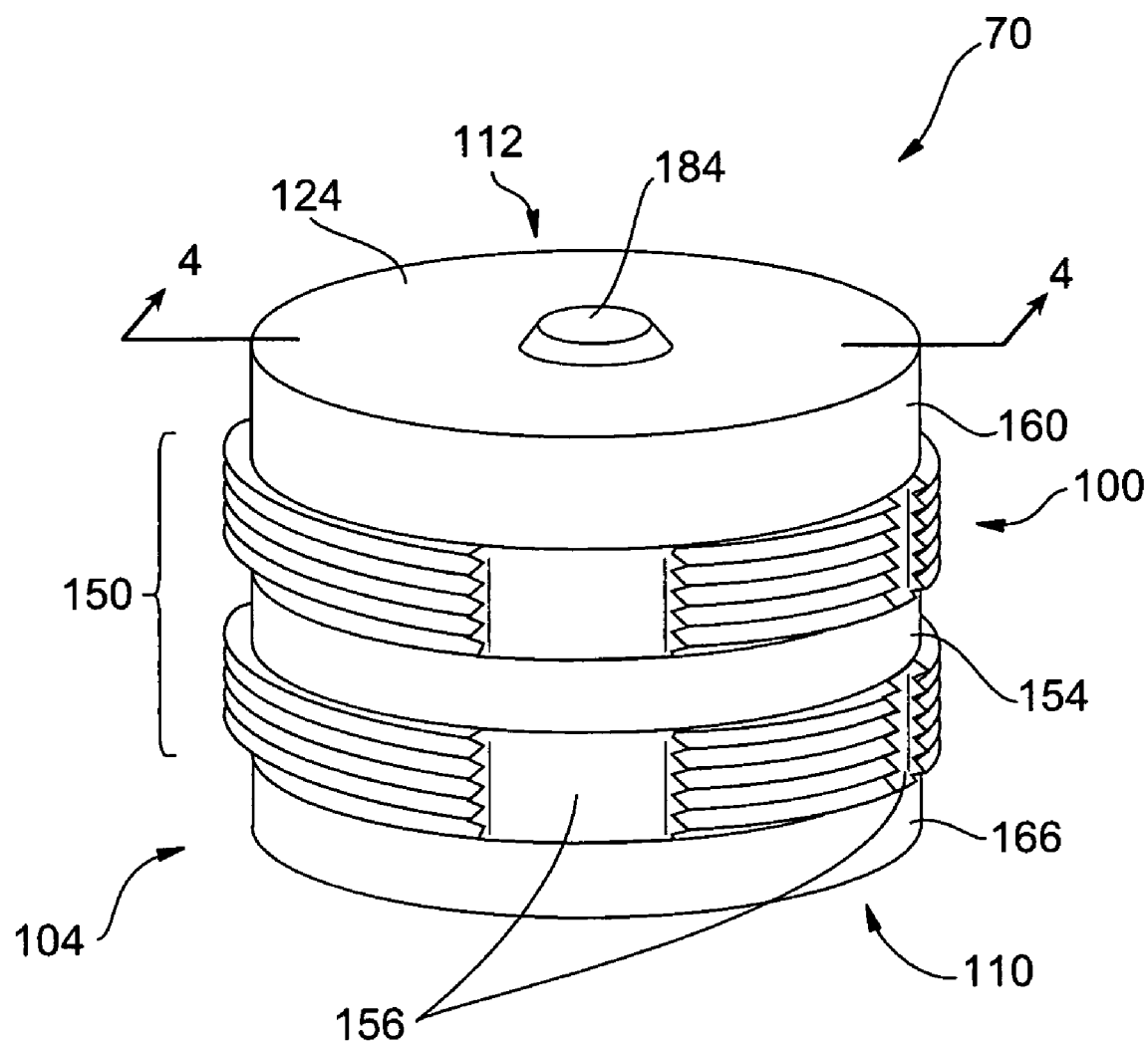
FIG. 3 is a close-up perspective view of an example embodiment of the reversible cap that makes up part of the battery housing.
Figure 4:
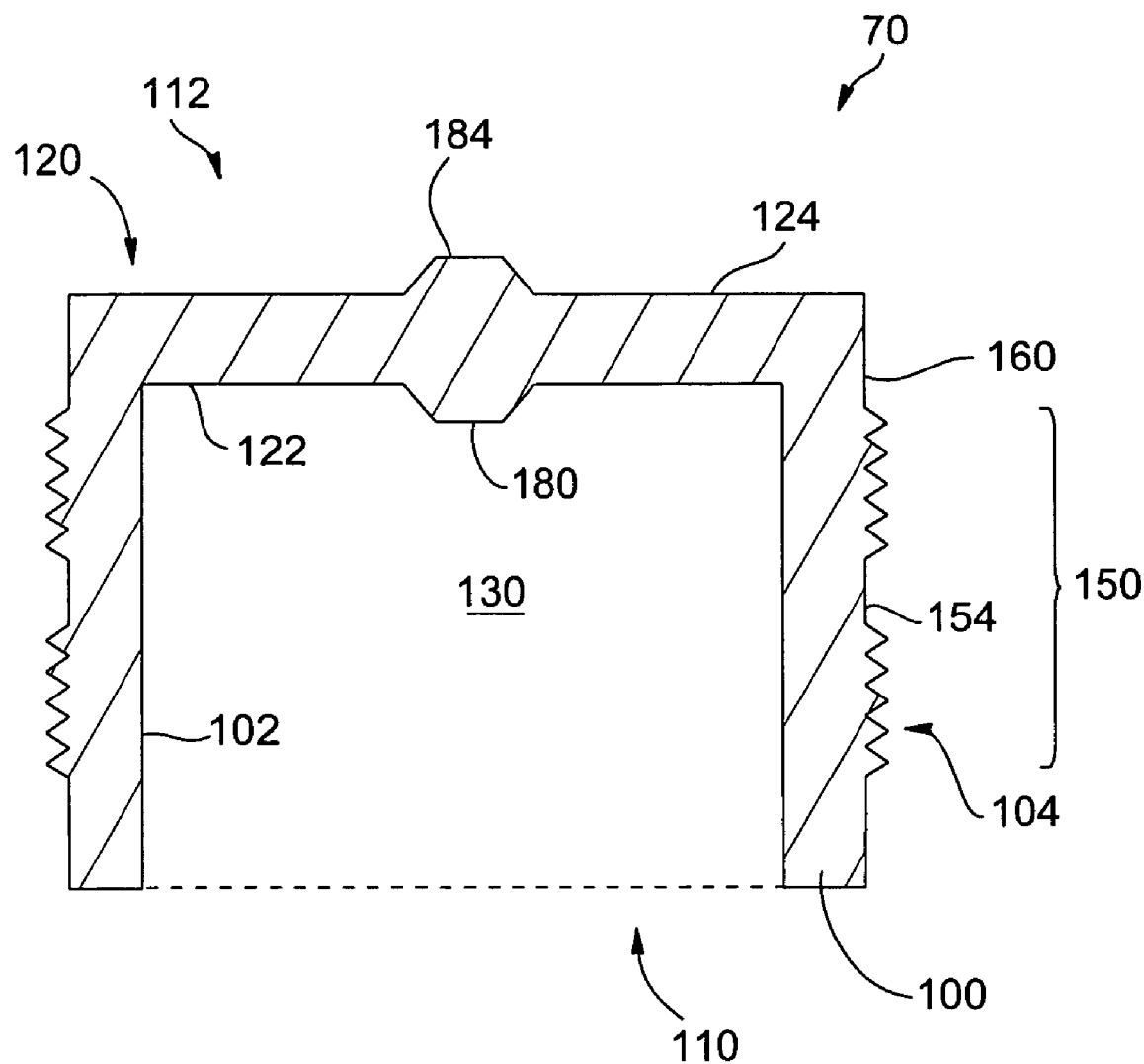
FIG. 4 is a close-up cross-sectional diagram of the reversible cap of FIG. 3 taken along the line 4-4.

FIG. 3 is a close-up perspective view of an example embodiment of reversible cap 70, and FIG. 4 is a close-up cross-sectional diagram of the reversible cap of FIG. 4 taken along the line 4-4. Reversible cap 70 is shown in FIGS. 3 and 4 in the AA orientation (open end down) for the sake of illustration. Reversible cap 70 has a cylindrical sidewall 100 having a central axis $A_C$, an inner surface 102, and an outer surface 104. Reversible cap 70 also has an open end 110 and an opposite closed end 112 closed by an end wall 120 having an inner surface 122 and an outer surface 124. Inner surfaces 102 and 122 define an open-ended cap interior 130 sized to closely accommodate the end portion of a standard AA battery.

Sidewall outer surface 104 includes centrally located outer threads 150. In an example embodiment, outer threads 150 are interrupted and include, for example, one or more horizontal gaps 154 and/or one or more vertical gaps 156. Sidewall outer surface 104 also includes a first smooth portion 160 that runs around the perimeter of the sidewall between closed-end 112 and outer threads 150. Likewise, the sidewall outer surface includes a second smooth portion 166 that runs around the perimeter of the sidewall between open end 110 and outer threads 150.

End wall 120 includes an inner contact 180 located on end wall inner surface 122 that protrudes into cap interior 130 and that serves as a first electrical contact, as explained below.

End wall 120 also includes an outer contact 184 located on end wall outer surface 124 and opposite inner contact 180 and that protrudes outwardly from the outer surface and that serves as a second electrical contact, as explained below.

Body Portion

Figure 5:
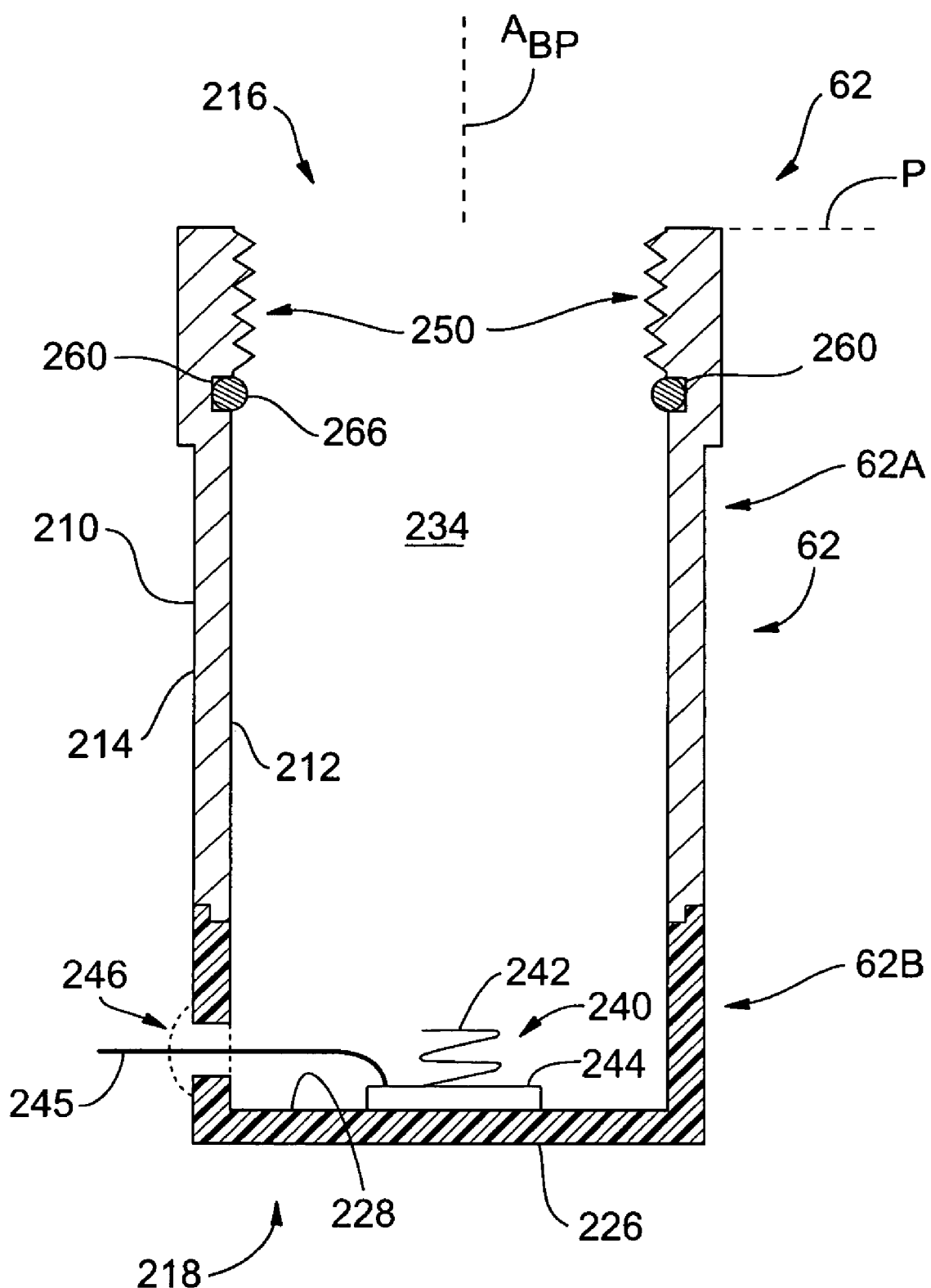
FIG. 5 is a close-up cross-sectional view of an example embodiment of the body portion of the battery housing.

FIG. 5 is a close-up cross-sectional view of an example embodiment of body portion 62. Body portion 62 includes a cylindrical sidewall 210 having a central axis $A_{BP}$, an inner surface 212, an outer surface 214, an open end 216 and a closed bottom end 218 closed with bottom wall 226 having an inner surface 228. Sidewall inner surface 212 and bottom wall inner surface 228 define a body portion interior 234. Body portion interior 234 is sized to closely accommodate a standard lithium battery.

In a preferred embodiment, body portion includes an upper conducting part ("upper body portion") 62A and a lower insulating (i.e., non-conducting) part ("lower body portion") 62B in sealed contact with the upper body portion (e.g., via a room-temperature vulcanizing (RTV) sealant). In an example embodiment, upper body portion 62A is made of metal and is used as a path to ground. In an example embodiment, lower body portion 62B is made of a temperature-resistant plastic such as DELRIN (a trademark of DUPONT Corporation), which is a durable acetal resin engineered plastic. Another suitable material for lower body portion 62B is acrylonitrile butadiene styrene (ABS).

Body portion 62 includes a positive electrical contact unit 240 fixed to or formed on bottom wall inner surface 228. Positive electrical contact unit 240 includes, for example, a contact element 242 electrically connected to a contact printed circuit board (PCB) 244. Contact PCB includes a wire 245 that passes through a sealed feed-through 246 in lower body portion 62B. Wire 245 leads to voltage-regulating circuit 90, as discussed in greater detail below. An example embodiment for positive electrical contact element 242 is a PCB spring.

Body portion 62 also includes a set of inner threads 250 that run around sidewall inner surface 212 at sidewall open end 216. Inner threads 250 are formed so as to threadedly engage cap threads 150. Located immediately below inner threads 250 is a groove 260 that runs around sidewall inner surface 212. Groove 260 is sized to accommodate an O-ring seal 266.

Battery Housing with Cap in AA Orientation

Figure 6:
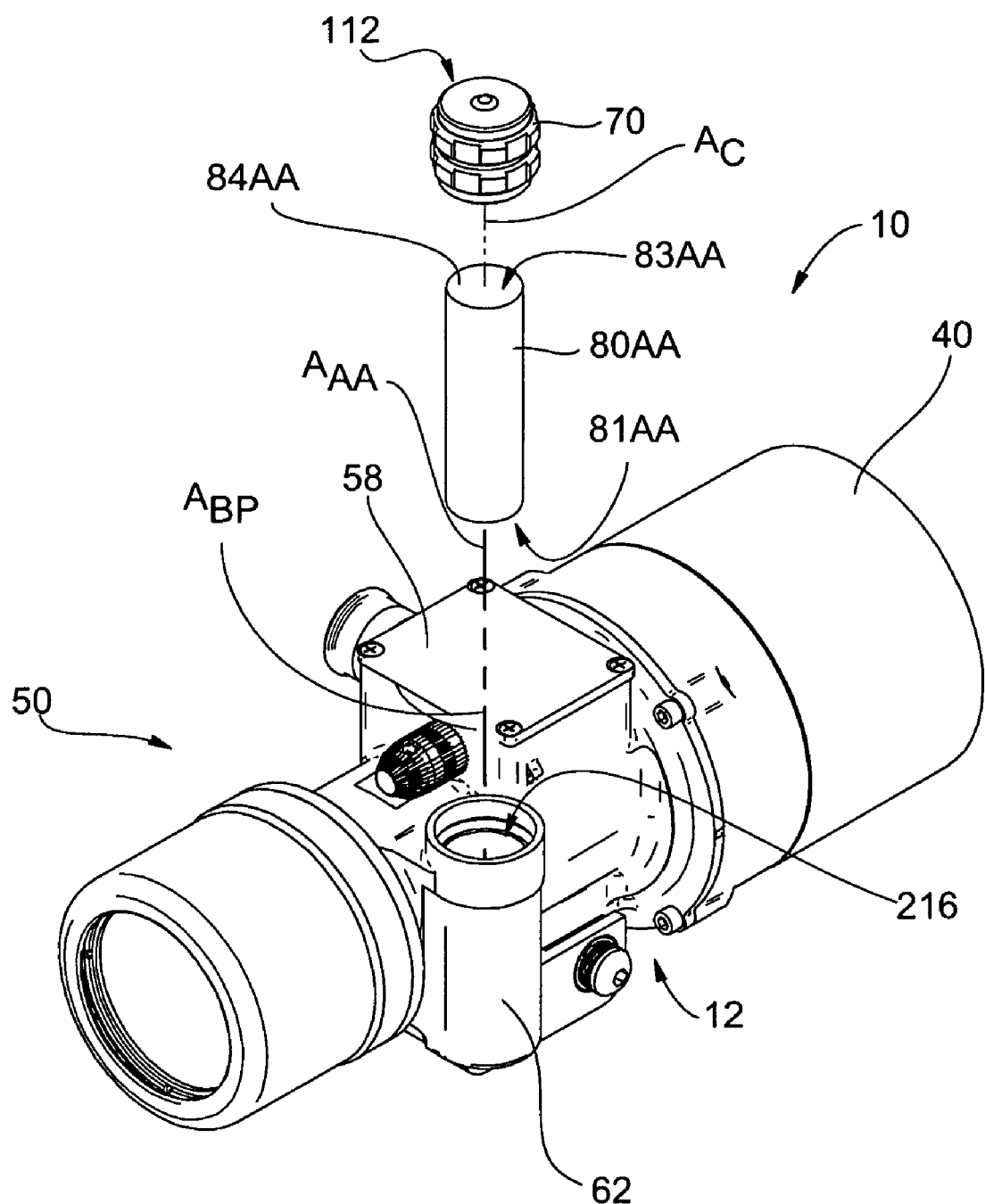
FIG. 6 is a perspective partially exploded view of the night-vision scope of the present invention, showing an AA battery being housed in the battery housing with the reversible cap in the AA orientation.

FIG. 6 is a perspective partially exploded view of night-vision scope 10, showing an AA battery 80AA being housed in battery housing 60 with reversible cap 70 in the AA orientation. Battery 80AA includes a central axis $A_{AA}$, a positive end 81AA having a positive contact 82AA, and a negative end 83AA having a negative contact 84AA. Note that AA battery 80AA is inserted into body portion 62 positive-end first.

Figure 7:
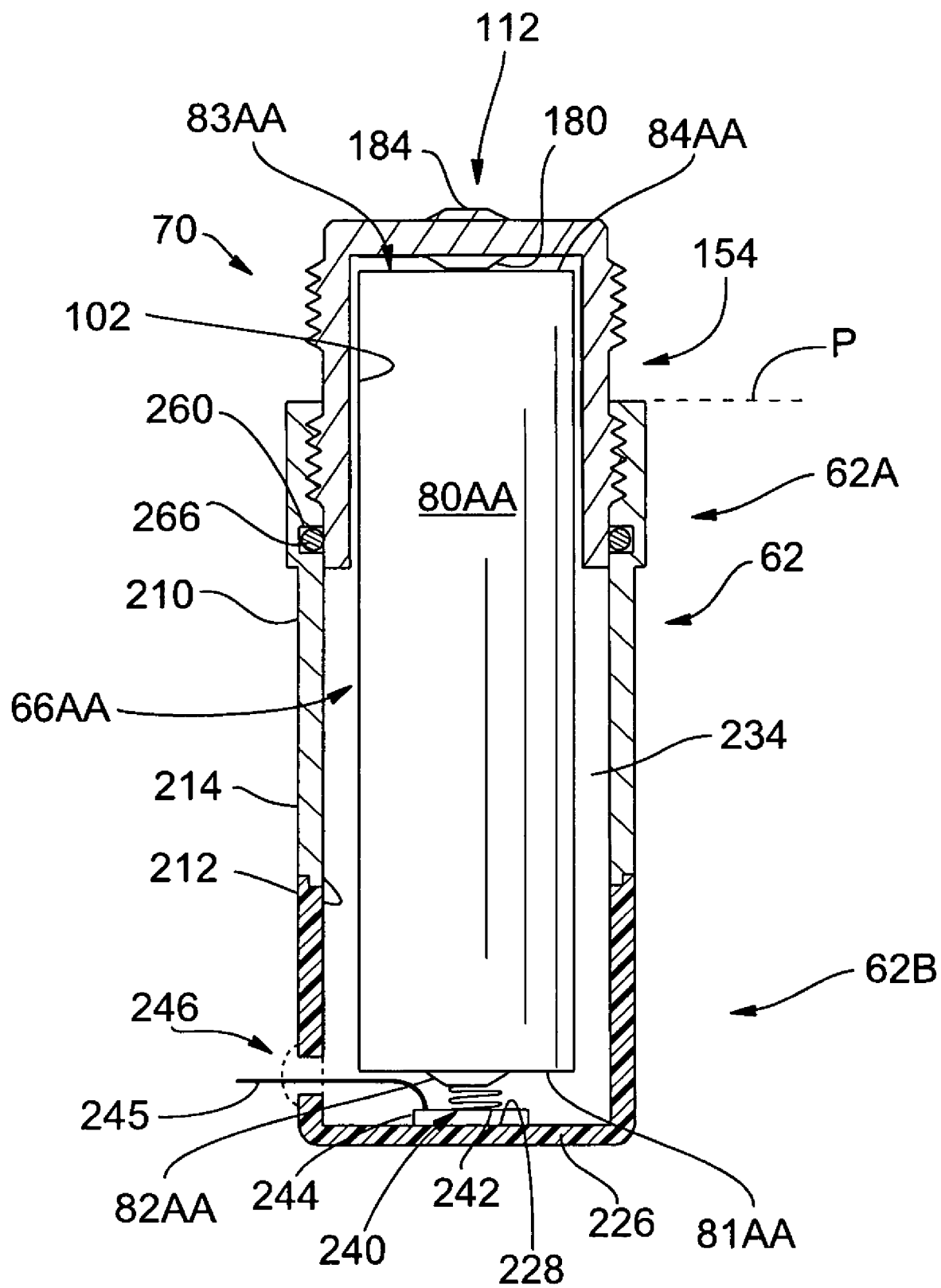
FIG. 7 is a close-up cross-sectional view of the battery housing of the night-vision scope of FIG. 6, with the reversible cap oriented in the AA position, and with an AA battery housed within the housing interior.

FIG. 7 is a close-up cross-sectional view of battery housing 60 with reversible cap 70 oriented in the AA position, and with an AA battery 80AA housed within housing interior 66A. When powering night-vision scope 10 with AA battery 80AA, the battery is placed within body portion interior 234 with its axis $A_{AA}$ co-axial with body portion axis $A_{BP}$ so that the battery's positive contact 82AA makes contact with positive electrical contact element 242 on bottom wall 228. At this point, the battery's negative end 83AA extends beyond the plane P of body portion open end 216. The open end 110 of reversible cap 70 is then placed over negative end 83AA of AA battery 80AA so that the outer cap threads 150 engage with body portion inner threads 250.

As cap 70 is screwed onto body portion 62, O-ring seal 266 engages smooth portion 166 of outer surface 106 near cap open end 110. When cap 70 is tightly attached to the body portion, the O-ring forms a water-tight seal with the cap at smooth surface portion 166. In a preferred example embodiment, the water-tight seal is certified to a water depth of at least 66 feet.

Cap electrical contact 180 is also brought into contact with the battery's negative contact 84AA. Cap interior portion 134 combines with body portion interior 234 to define a battery housing interior 66AA. Housing interior 66AA accommodates the AA battery 80AA, with the lower portion of AA battery 80AA housed in body portion interior 234 with some room between the battery and the inner surface 212 of cylindrical sidewall 210. The upper portion (e.g., about 25% or greater) of AA battery 80AA associated with negative end 83AA is closely engaged by inner surface 102 of cap cylindrical sidewall 100. This firmly holds AA battery 80AA within battery housing 60 even in the presence of rifle shock so that battery electrical contact is maintained with voltage regulating circuit 90. Night-scope 10 is thus able to be powered by an AA battery 80AA that outputs 1.5 volts, even under extreme operating conditions.

Note that horizontal gaps 154 and/or vertical gaps 156 in outer threads 150 of cap 70 (see also FIG. 1) form interrupted threads that facilitate gripping the cap when screwing it onto or unscrewing it from body portion 62. This is an important advantage of the present invention, given that a person using rifle 22 may be wearing gloves when they need to remove and/or insert a battery into the battery housing.

Battery Housing with Cap in L-Orientation

Figure 8:
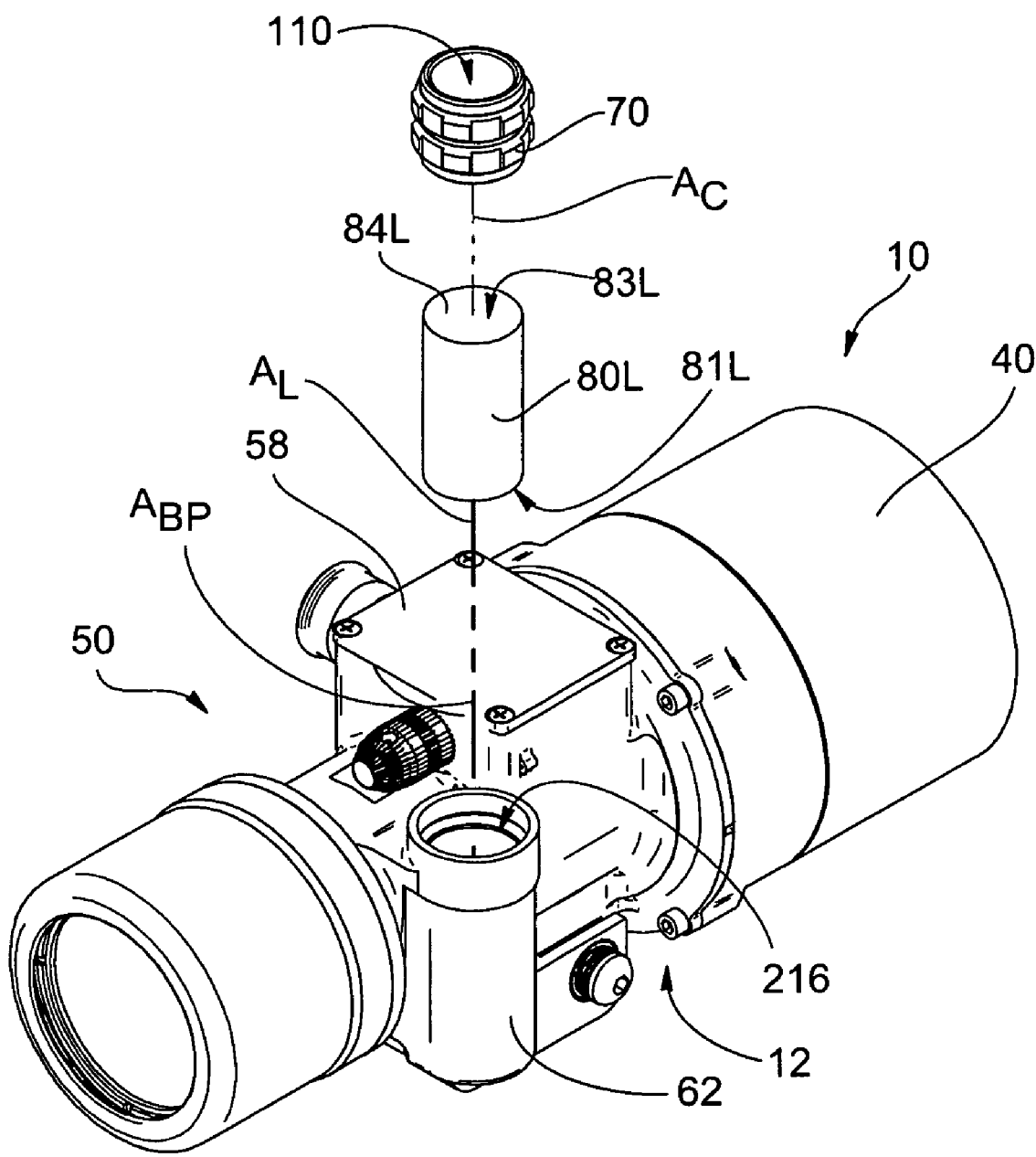
FIG. 8 is a perspective partially exploded view of the night-vision scope of the present invention, showing a lithium battery being housed in the battery housing with the reversible cap in the L orientation.
Figure 9:
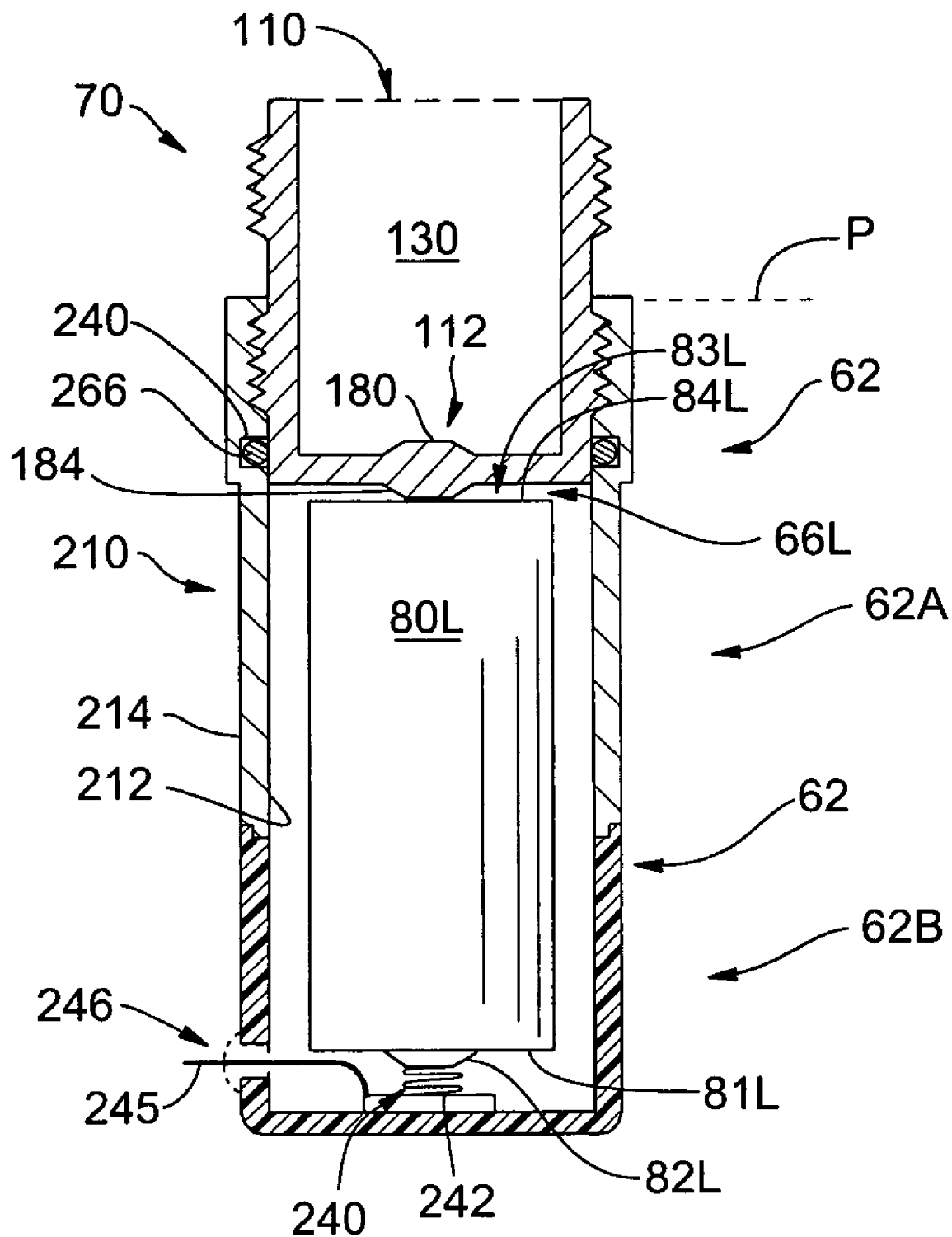
FIG. 9 is a close-up cross-sectional view of the battery housing of the night-vision scope of FIG. 8, with the reversible cap in the L-orientation, and with a lithium battery housed within the housing interior.

FIG. 8 is a perspective partially exploded view of night-vision scope 10 similar to FIG. 6, but showing a lithium battery 80L being housed in battery housing 60 with reversible cap 70 in the L orientation. Battery 80L includes a central axis $A_L$, a positive end 81L having a positive contact 82L and a negative end 83L having a negative contact 84L. FIG. 9 is a close-up cross-sectional view of battery housing 60 similar to FIG. 7, but with reversible cap 70 in the L-orientation, and with lithium battery 80L housed within housing interior 66L positive-side down.

When powering night-vision scope 10 with a lithium battery 80L, the lithium battery is placed within body portion interior 234 with its central axis $A_L$ co-axial with body portion axis $A_{BP}$ so that the positive battery contact 82L makes contact with positive battery contact element 242. At this point, the negative end 83L of lithium battery 80L resides below the plane P defined by open end 216 of body portion 62. The closed end 112 of reversible cap 70 is then inserted into open end 216 of body portion 62 so that the cap threads 150 engage with the body portion threads 250. As cap 70 is screwed onto body portion 62, O-ring seal 266 engages smooth portion 160 of outer surface 106 near cap closed end 112. When cap 70 is tightly attached to the body portion, the O-ring forms a water-tight seal with the cap. In a preferred example embodiment, the water-tight seal is certified to a water depth of at least 66 feet.

Cap exterior contact 184 is also brought into contact with negative battery contact 180 when cap 70 is tightened. When in its fully engaged position, cap 70 protrudes into body portion interior 234 to define a battery housing interior 66L smaller than the body portion interior and that closely accommodates lithium battery 80L all around. This arrangement firmly holds battery 80L within battery housing 60 even in the presence of rifle shock so that battery electrical contact is maintained with voltage regulating circuit 90. Night-vision scope 10 is thus ready to be powered by a 3-volt lithium battery 80L even under extreme operating conditions.

As with the case of the AA-cap orientation, in an example embodiment the L-cap orientation provides user access interrupted outer threads 150 to facilitate the gripping of cap 70 when screwing it into or unscrewing it from body portion 62.

Voltage Regulating Circuit

Figure 10:
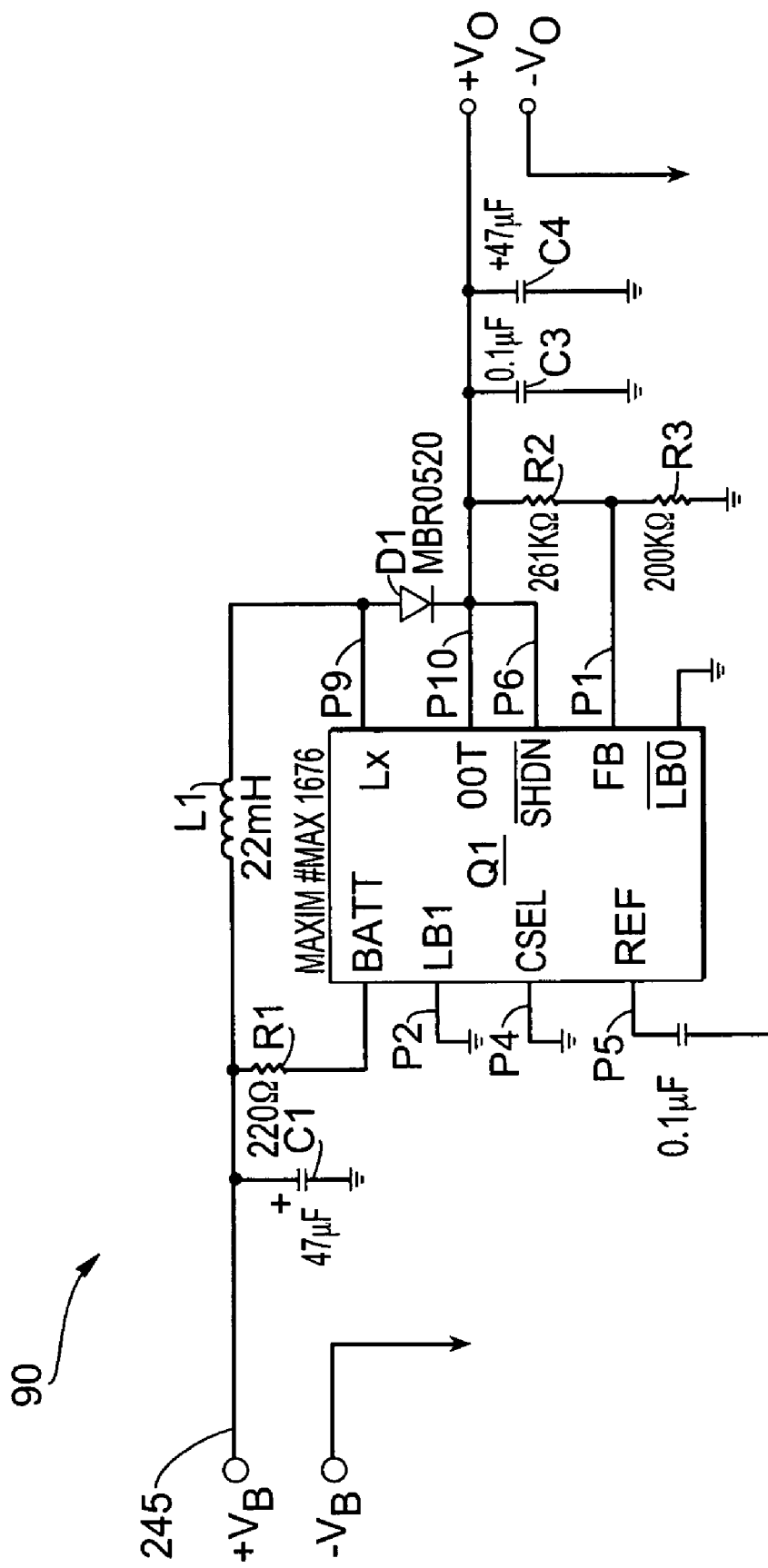
FIG. 10 is a schematic diagram of an example embodiment of the battery adapter system of the present invention, showing details of an example embodiment of the voltage-regulation circuit of the present invention.

FIG. 10 is a schematic circuit diagram of an example embodiment of voltage regulating circuit 90. As discussed above, in an example embodiment, voltage regulating circuit 90 is located in housing 58 of night-vision scope 10 and is electrically connected to the battery held in battery housing 60 via wire 245 and to image intensifier device 52. Voltage regulating circuit 90 provides a regulated, stable voltage source of 3 VDC at 20 milliamperes for optimum performance. Voltage regulating circuit 90 converts a battery voltage $V_B$ within the range of 0.6 to 3 VDC to a regulated, stable output voltage $V_O$ of 3 VDC, which is provided to image-intensifier device 52. The circuit is completed by returning to the grounded housing 60 (conducting upper body portion 62A).

Voltage regulating circuit 90 allows the night-vision scope to be operated with either the single AA battery 80AA that provides 1.5 VDC when fully charged, or the single lithium battery 80L that outputs 3 VDC when fully charged. Equally important, the night-vision scope can be operated with substantially less voltage when either of these batteries is weak from use. This also allows the night-vision scope to be made smaller while also having an acceptable running time with no degradation in night-vision scope performance right up to the battery's useful life. Also, for the standard two-battery unit, battery life is greatly extended (by 4 times). This is because the individual AA or lithium batteries can go from 1.5 VDC (when new) to 0.6 VDC (when drained), which is well beyond the standard end-of-life of 1.1 VDC, with the circuit still providing an output voltage $V_O$ of 3 VDC.

Voltage regulating circuit 90 preferably uses a commercially available integrated circuit Q1. The circuit "charges" an inductor L1 (e.g., 22 mH) from the external battery 80AA or 80L with a current flow of about 0.5 amperes and then "discharges" the inductor into the load circuit (i.e. image intensifier device 52). When an inductor is rapidly discharged (i.e. when it is disconnected from its current source), the voltage across it rises due to the collapsing magnetic field around the inductor. This tends to keep the current flowing. This voltage appears at output pin P10 of Q1 and is filtered/smoothed by capacitors C3 and C4.

Transistor switches (not shown) inside Q1 automatically perform the connecting of L1, first to the external battery, and then to the load circuit. Q1 constantly measures the output voltage by looking at the junction of R2 and R3 via pin P1 (labeled "FB" for "Feedback"). Resistors R2 and R3 form a voltage divider that outputs 1.3 VDC to Q1 pin P1 when pin P10 (i.e. output) is at 3 VDC. 1.3 VDC is compared inside Q1 with a precision 1.3 VDC reference voltage located inside Q1. Thus, Q1's internal control circuitry is able to adjust the switching cycle timing of charging and discharging L1 in order to maintain a nearly constant output of 3 VDC.

An advantage of the battery adapter system of the present invention is that the voltage regulator circuit provides the particular electrical and/or optical device with 3 VDC even when the particular battery being used is past its useful lifetime. As mentioned above, the voltage regulator circuit is able to provide an output voltage of 3 VDC even when the battery is only outputting a voltage of 0.6 volts. Prior art systems for powering with one or more batteries electrical and/or optical devices such as in the form of image intensifier devices require replacing the battery prior to the battery output reaching such a low output voltage. Since most missions involving night-vision scopes last 24 hours or less, the present invention allows a single fresh battery to be inserted prior to the mission and then used during the mission without the user having to switch batteries. In situations where the user needs to switch batteries, the user need only carry single batteries of either the lithium type or the AA type. The reversible cap makes switching batteries very easy, and the fact that only a single battery needs to replace another single battery also makes the battery switching operation easy to perform, regardless of the type of electronic and/or optical device being powered.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A battery adapter system configurable to accommodate first smaller battery or a second larger battery having different voltages, comprising:
   a housing that includes a body portion adapted to accommodate through an open end either the entire first battery or a portion of the second battery and to establish electrical contact with whichever battery is used;
   a reversible cap with a closed end, an open end and an interior, the cap being adapted to be removably attach to the body portion i) in a first orientation that forms a first sealed housing interior that does not include the cap interior and that operably houses the first battery, and ii) in a second orientation that forms a second sealed housing interior that includes the cap interior and that operably houses the second battery; and
   a voltage regulating circuit electrically connected to the battery and adapted to provide a substantially constant output voltage.

2. The battery adapter system of claim 1, wherein the voltage regulating circuit is configured to generate said substantially constant output voltage in an amount of 3 VDC based on a voltage provided by either the first or second battery, wherein the first or second battery voltage ranges from about 0.6 VDC to about 3 VDC.

3. The battery adapter system of claim 2, wherein the first battery is a 3 VDC lithium DL123 battery and the second battery is a 1.5 VDC AA battery.

4. The battery adapter system of claim 1, wherein the body portion includes an O-ring seal near the open end that provides a water-tight seal certified to a water depth of at least 66 feet when the reversible cap is attached to the body portion in either orientation.

5. The battery adapter system of claim 1, wherein:
   the reversible cap threadedly attaches to the housing, with the reversible cap having an outer surface with centrally located outer threads that run around the surface and that are surrounded by upper and lower smooth outer surface portions;
   the body portion has an interior surface with inner threads formed therein between the body portion open end the O-ring seal; and
   the outer threads are adapted to engage the inner threads to attach the cap to the body portion for either cap orientation.

6. The battery adapter system of claim 5, wherein the outer threads are interrupted to facilitate gripping of the reversible cap when attaching or removing the cap from the body portion in either cap orientation.

7. The battery adapter system of claim 5, wherein the upper and lower smooth surface portions respectively engage the O-ring seal when the cap is threadedly attached to the body portion in either the first or second cap orientations.

8. The battery adapter system of claim 1, wherein the voltage regulating circuit is electrically connected to a device so as to power the device.

9. The battery adapter system of claim 8, wherein the device is an electrical and/or optical device.

10. The battery adapter system of claim 9, wherein the electrical and/or optical device is a light-emitting and/or light amplification device.

11. The battery adapter system of claim 8, wherein the device is an image-intensification assembly.

12. The battery adapter system of claim 8, wherein the device is an image-intensification device within the image-intensification assembly.

13. The battery adapter system of claim 1, wherein the first and second housing interiors are respectively sized to firmly hold the first and second batteries in place so that the first and second batteries are resistant to movement.

14. The battery adapter system of claim 1, wherein the housing is incorporated into an optical and/or an electronic system.

15. The battery adapter system of claim 1, wherein the optical and/or electronic system is a night vision scope.

16. A battery adapter system for powering an electrical and/or optical device using one of first and second batteries having different sizes and voltages, comprising:
a housing that includes a body portion configured to axially accommodate through an open end either the entire first battery or a portion of the second battery; and
a reversible cap having an open end and an interior and adapted to threadedly attach to the body portion in first and second orientations, wherein the first orientation forms a first sealed housing interior that does not include the cap interior and that operably houses the first battery, and wherein the second orientation forms a second sealed housing interior that includes the cap interior and that operably houses the second battery.

17. The battery adapter system of claim 16, further including:
a voltage regulating circuit electrically connected to the battery in the housing and configured to provide a substantially constant output voltage from a range of battery voltages.

18. The battery adapter system of claim 17, wherein the voltage regulating circuit provides a 3 VDC output and wherein the battery voltages range from about 0.6 VDC to about 3 VDC.

19. The battery adapter system of claim 16, wherein the first battery is a 3V lithium DL123 battery and the second battery is a 1.5V AA battery.

20. The battery adapter system of claim 16, wherein the voltage regulating circuit is operably connected to an electrical and/or optical device.

21. The battery adapter system of claim 20, wherein the electrical and/or optical device includes an image-intensifier device.

22. The battery adapter system of claim 20, wherein the electrical and/or optical device includes a light-emitting device.

23. The battery adapter system of claim 22, wherein the light-emitting device is an image-intensifier device.

* * * * *